F. TYSON.
ICE CREAM FREEZER.
APPLICATION FILED OCT. 31, 1908.
923,609.
Patented June 1, 1909.
4 SHEETS—SHEET 3.
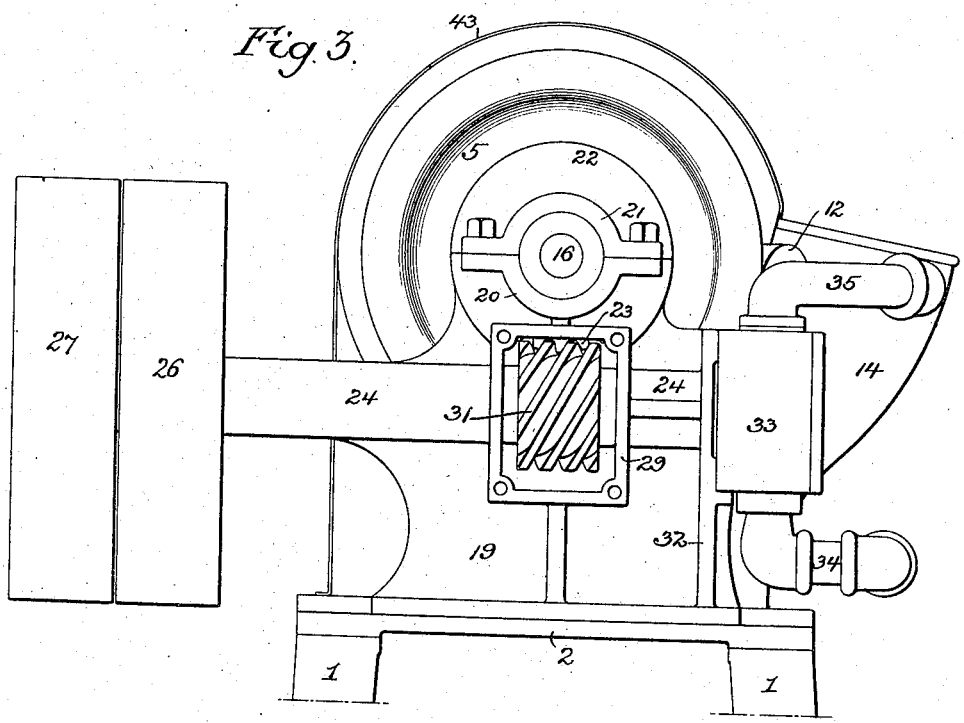
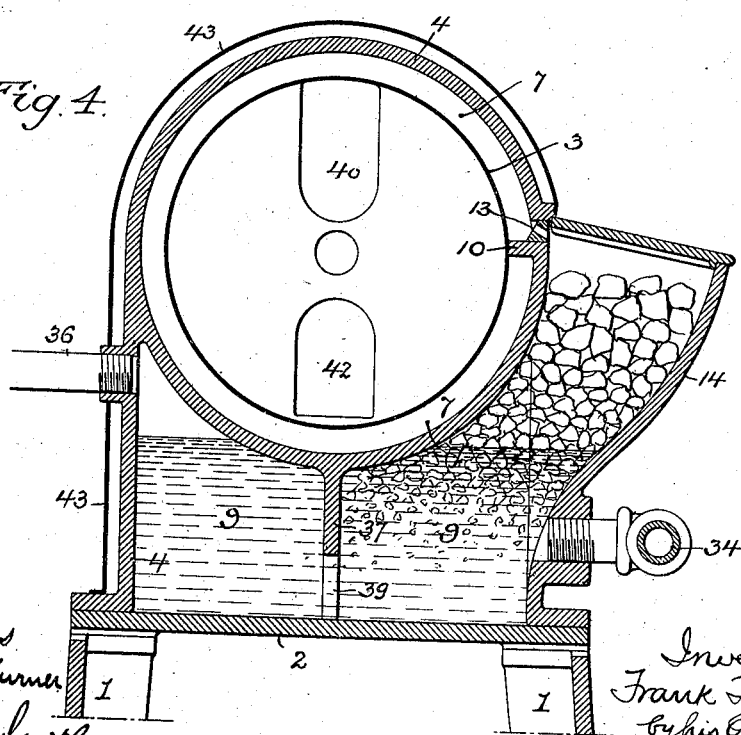

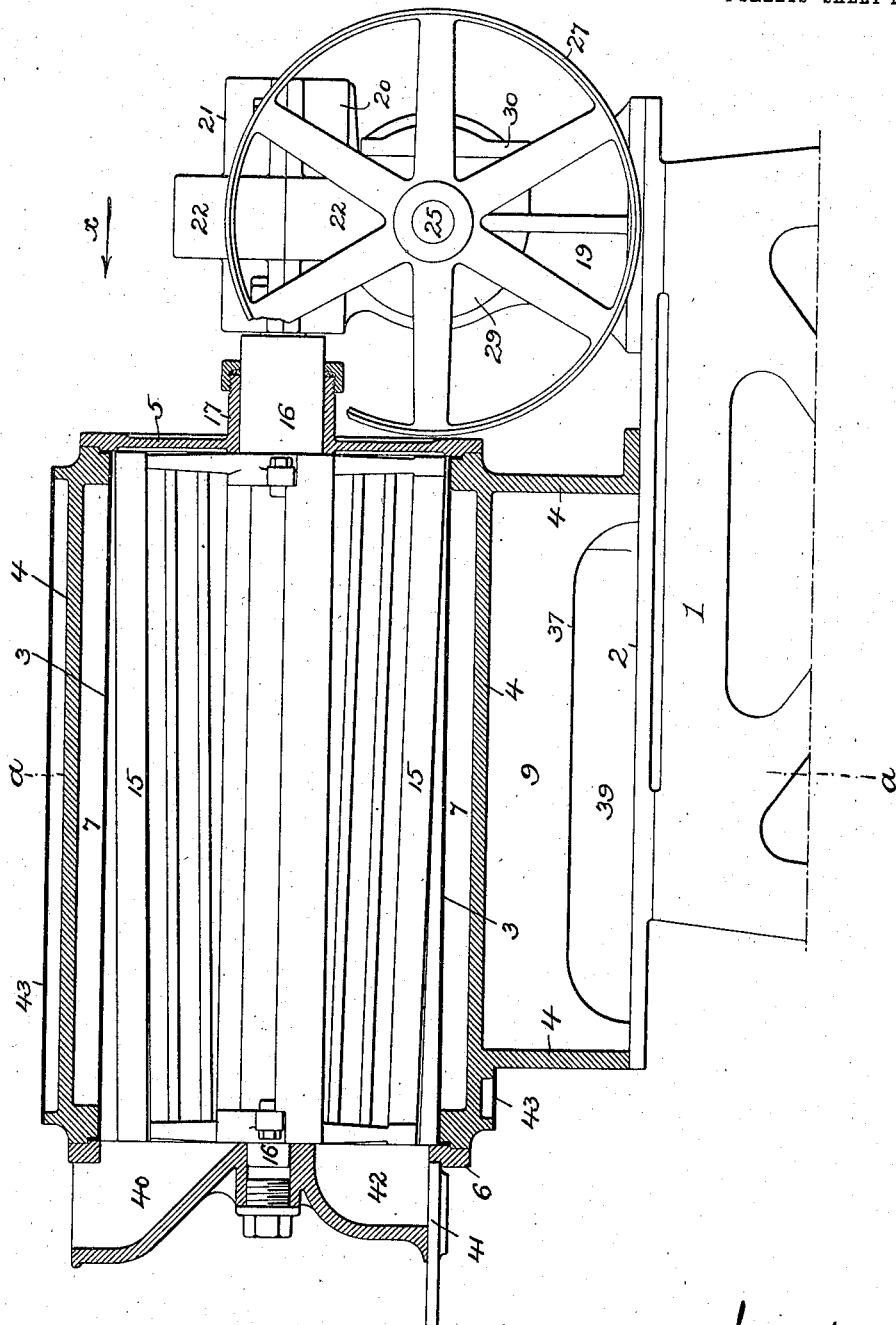

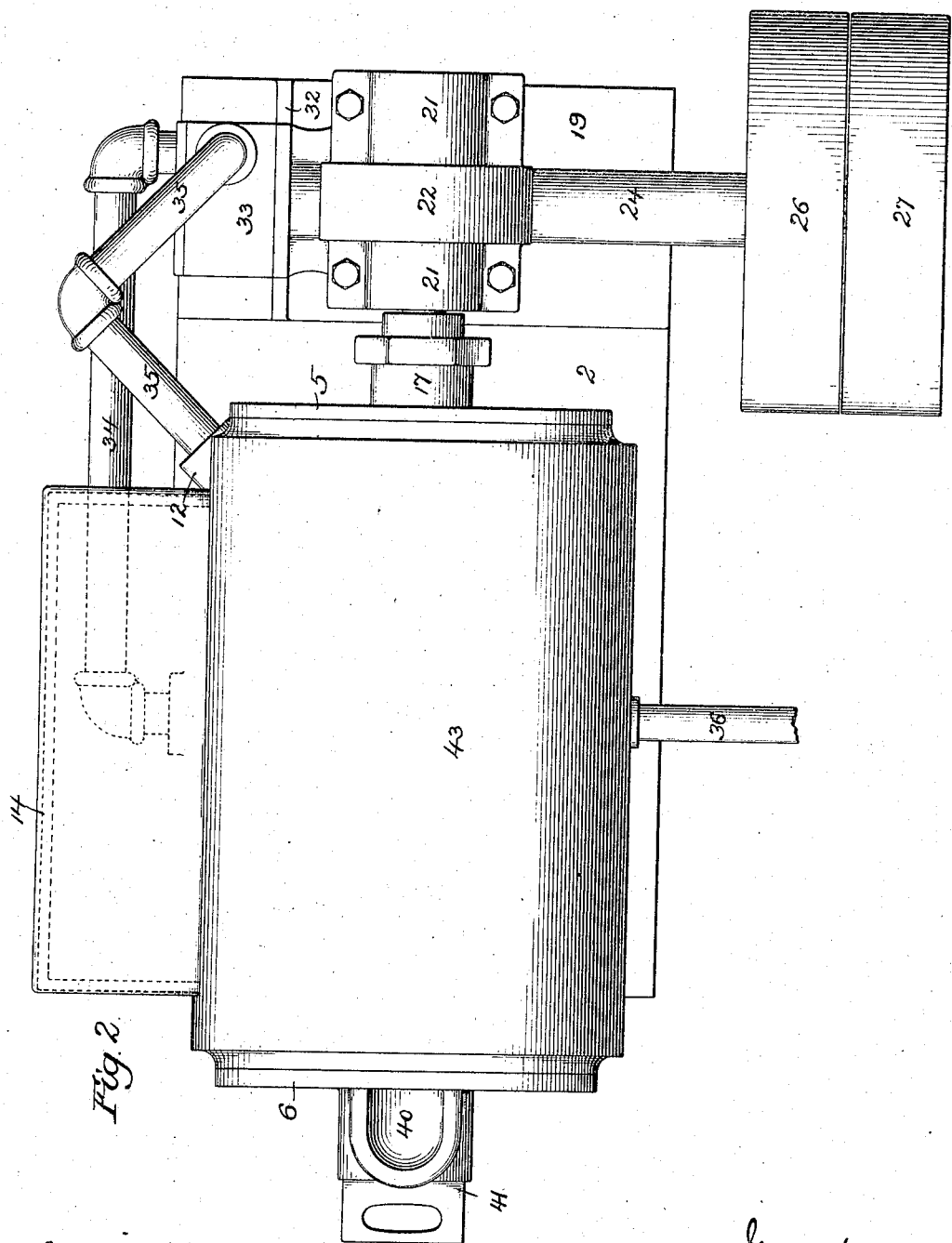

F. TYSON.
ICE CREAM FREEZER.
APPLICATION FILED OCT. 31, 1908.
923,609.
Patented June 1, 1909.
4 SHEETS—SHEET 4.
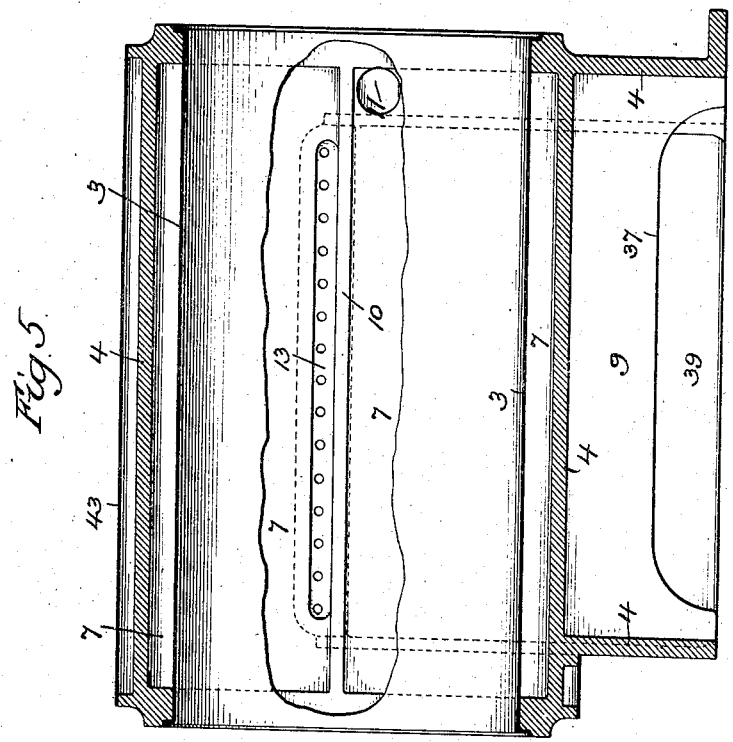
Witnesses
Hamilton J. Turner
Harry L. Smith
Inventor
Frank Tyson
by his Attorneys
Smith Frazier

UNITED STATES PATENT OFFICE.

FRANK TYSON, OF CANTON, OHIO.

ICE-CREAM FREEZER.

No. 923,609.   Specification of Letters Patent.   Patented June 1, 1909.

Application filed October 31, 1908. Serial No. 460,396.

*To all whom it may concern:*

Be it known that I, FRANK TYSON, a citizen of the United States, residing in Canton, Ohio, have invented certain Improvements in Ice-Cream Freezers, of which the following is a specification.

My invention relates to that class of ice cream freezers in which brine or other refrigerating liquid is circulated around the cream receptacle, the object of my invention being to so construct an ice cream freezer of this type that it will occupy but a minimum amount of floor space and will require for its operation a minimum number of parts, a minimum amount of brine and a minimum amount of labor, the machine having been especially designed for use by those who make ice cream or other frozen products on a relatively small scale.

In the accompanying drawings, Figure 1 is a view, partly in side elevation and partly in longitudinal section, of an ice cream freezer constructed in accordance with my invention; Fig. 2 is a plan or top view of the same; Fig. 3 is an end view looking in the direction of the arrow $x$, Fig. 1; Fig. 4 is a transverse section on the line $a$—$a$, Fig. 1, and Fig. 5 is a longitudinal section of the main body or casing of the apparatus, with portions of the cream receptacle cut away in order to show the structure of certain parts of the receptacle which surrounds the same.

In the drawings, 1 represents part of the supporting framework, which carries a plate 2 upon which the freezer and the operating mechanism therefor are mounted and to which they are secured in any desirable way.

The cream receptacle is represented at 3, and is mounted in and secured to an outer receptacle 4 so as to provide a water-tight joint between the two, a result which is preferably secured by expanding the ends of the receptacle 3 into suitable recesses in the ends of the receptacle 4, to which recesses the opposite heads 5 and 6 of said receptacles are also fitted.

Within the receptacle 4 are two chambers 7 and 9, the chamber 7 surrounding the cream receptacle 3 and having a transverse partition 10 which contacts with said cream receptacle and serves to separate the inlet end of the chamber 7 from the outlet end of the same, the inlet passage 11 communicating with a boss 12 at one end of the receptacle 4 and the outlet being provided with a perforated delivery plate 13, as shown in Figs. 4 and 5. The chamber 9 occupies the base of the receptacle 4 beneath that portion of the same which envelops the lower half of the chamber 7, and said chamber 9 communicates at one side of the freezer with a hopper 14, the latter receiving in its upper portion the refrigerating liquid discharged from the chamber 7 through the perforated delivery plate 13.

The cream receptacle 3 is provided with dasher mechanism 15 of any appropriate character, the dasher shaft 16 having at one end an inclosed bearing in the head 6 and passing at its opposite end through a stuffing box 17 on the head 5.

Mounted upon the base 2 at this end of the machine is a structure 19 provided at the top with the lower member 20 of the bearing for the reduced outer end of the shaft 16, this bearing having a suitable detachable cap 21, and both members of the bearing being enlarged centrally, as shown at 22, to accommodate that member 23 of the driving gearing which is carried by the shaft 16. This gearing may be of any desirable character, wheels having inclined and intermeshing teeth being preferred. Also forming part of the structure 19 is a bearing 24 for the driving shaft 25, which is provided with the usual fast and loose pulleys 26 and 27, or other means for applying power thereto. The bearing 24 is enlarged, as shown at 29, and this enlarged portion is provided with a detachable face plate or cap 30, shown in Fig. 1, and provides a chamber for the reception of that member 31 of the driving gearing which is carried by the shaft 25 (see Fig. 3).

To a face plate 32 at the outer end of the structure 19 is secured the casing 33 of a rotary circulating pump whose rotating member is carried by the shaft 25, said circulating pump having an inlet pipe 34 and a discharge pipe 35, the inlet pipe communicating with the chamber 9 of the receptacle 4 and the discharge pipe 35 communicating with the inlet passage 11 of the chamber 7, as shown in Figs. 2 and 3.

At one side of the receptacle 4 and communicating with the chamber 9, is an overflow 36, and centrally disposed in said chamber 9 is a longitudinal partition 37 dividing said chamber into two parts which, however, can communicate freely with one another through one or more openings 39 in said partition, as shown in Fig. 4.

In operating the freezer the front portion of the chamber 9 and the hopper 14 communicating therewith are filled with a mixture of ice and salt, and as soon as the ice is melted sufficiently to produce a proper volume of brine in the chamber 9 power is applied to the shaft 25 so as to operate the circulating pump and start a circulation of said brine through the chamber 7, the discharge of the brine into the upper portion of the hopper 14 after it has circulated around the casing 3 serving to continue the melting of the ice, the hopper being replenished from time to time with additional supplies of ice and salt, and the level of the brine being maintained at or below the level of the overflow 36. The use of the longitudinal partition 37 in the brine chamber 9 serves to reduce the amount of ice required without restricting the capacity of the brine chamber, it being advisable to keep the hopper 14 fairly well filled with ice in order that the brine discharged from the outlet 13 of the chamber 7 may impinge upon said ice. When the shaft 25 is started it will also start the rotation of the dasher shaft 16 and as soon as a proper circulation of brine in the chamber 7 has been established the cream or other mixture to be frozen may be introduced into the cream receptacle through the feed hopper 40 at the upper portion of the head 6, and when the charge has been frozen it can be automatically discharged from the cream receptacle by opening a valve 41 which normally closes a discharge nozzle 42 on the lower portion of said head 6, as shown in Fig. 1.

To prevent or lessen the abstraction of heat by the brine from the receptacle 4 all portions of said receptacle outside of the limits of the hopper 14 are, by preference, provided with an outer casing or jacket 43, preferably of sheet metal, which may thus provide between itself and the receptacle 4 a dead-air chamber or a chamber to be filled with material which is a non-conductor or a poor conductor of heat.

The construction which I have devised permits of the use of the same shaft for driving both the brine circulating pump and the dasher shaft of the freezer, and it shortens the pipe connections between the brine producer and the brine circulating chamber of the freezer and provides for such a compact disposition of the parts as to materially reduce the labor of attendance as compared with that required in apparatus in which the freezer, brine producer and brine pump are separated and independently operated structures.

I claim:

1. The combination, in an ice cream freezer, of a cream receptacle and an external receptacle carrying the same and containing a brine producing chamber and a brine circulating chamber in which the cream receptacle is disposed.

2. The combination, in an ice cream freezer, of a cream receptacle, an external receptacle carrying the same and containing a brine producing chamber and a brine circulating chamber, in which the cream receptacle is disposed, and means for conveying brine from the producer chamber to the circulating chamber and back again.

3. The combination, in an ice cream freezer, of a cream receptacle, an external receptacle carrying the same and containing a brine producing chamber and a brine circulating chamber in which the cream receptacle is disposed, and means, including a circulating pump, for conveying brine from the producer chamber to the circulating chamber and back again.

4. The combination, in an ice cream freezer, of a horizontal cream receptacle, and an external receptacle surrounding said cream receptacle and forming a brine circulating chamber around the same, said external receptacle having, in its lower portion, a brine producing chamber.

5. The combination, in an ice cream freezer, of a cream receptacle, and an external receptacle inclosing the same, and a brine circulating chamber in which the cream receptacle is disposed, said external receptacle also having a brine producing chamber with ice-receiving hopper at one side of the same.

6. The combination, in an ice cream freezer, of a cream receptacle and an external receptacle inclosing the same and providing a brine circulating chamber in which said cream receptacle is disposed, said external receptacle having a brine producing chamber with ice-receiving hopper at one side of the same, and a longitudinal partition dividing it into two portions, one of which communicates with said ice-receiving hopper.

7. The combination, in an ice cream freezer, of a cream receptacle and an external receptacle containing a brine producing chamber with ice-receiving hopper at one side of the same, said external receptacle also inclosing a brine circulating chamber in which the cream receptacle is disposed, which latter chamber discharges into the ice-receiving hopper.

8. The combination, in an ice cream freezer, of a cream receptacle, an external receptacle containing a brine circulating chamber in which the cream receptacle is disposed, a brine producer, connections, including a rotary circulating pump, between said brine producer and the brine circulating chamber, dasher mechanism located within the cream receptacle, and a single shaft which drives the latter mechanism and is directly connected to the rotary member of the brine circulating pump.

9. The combination, in an ice cream freezer, of a cream receptacle, an external receptacle containing a brine circulating chamber in which the cream receptacle is disposed, the external receptacle having a longitudinal partition whereby its inlet and outlet portions are separated from one another, a brine producer which receives the discharge from said brine circulating chamber, and flow connections between said brine producer and the inlet end of the brine circulating chamber.

10. The combination, in an ice cream freezer, of a cream receptacle, an external receptacle containing a brine circulating chamber in which said cream receptacle is disposed, a brine producer, connections, including a circulating pump, between said brine producer and the brine circulating chamber, and a structure having bearings for the dasher shaft of the freezer and for the driving shaft, and also having a face plate to which the casing of the circulating pump is attached.

In testimony whereof, I have signed my name to this specification in the presence of two subscribing witnesses.

FRANK TYSON.

Witnesses:
 H. B. STEWART,
 ISAAC H. TAYLOR.